Patented Feb. 5, 1952

2,584,544

UNITED STATES PATENT OFFICE 2,584,544

ORGANO-SILICON COMPOUNDS

Raymond H. Bunnell, Toledo, Ohio, assignor to Libbey-Owens-Ford Glass Company, Toledo, Ohio, a corporation of Ohio No Drawing. Application April 2, 1949, Serial No. 85,256

12 Claims. (Cl. 260—448.2)

The invention relates to a novel class of substances which may be readily decomposed to produce alkenyl aromatic compounds, including particularly vinyl aromatic compounds.

It is known that the properties of the synthetic resin produced by the polymerization of styrene can be improved in many cases by incorporating with the styrene, before polymerization, a small proportion of another vinyl aromatic compound such as a substituted styrene. Often the improvement produced by so incorporating another vinyl aromatic compound is out of proportion to the amount of the other vinyl aromatic compound that is incorporated. However, vinyl aromatic compounds other than styrene have been relatively expensive to produce heretofore. Usually it has been necessary to devise a new method of preparation each time a new vinyl aromatic compound has been desired, so that the number of known vinyl aromatic compounds is relatively limited, and there are many theoretically possible vinyl aromatic compounds that never have been prepared.

The principal object of the invention is to provide novel substances of a type which is inexpensive to prepare, which contains an aromatic radical that may be of any desired configuration, and which decomposes readily to an alkenyl aromatic compound. More specific objects and advantages are apparent from the description, which illustrates and discloses but is not intended to limit the scope of the invention.

The present invention is based upon the discovery of a novel substance of a type which contains an aromatic radical that may be of any desired configuration, and to the further discovery that such a substance is readily decomposed to produce an alkenyl aromatic compound whose molecule consists of the aromatic radical connected to an alkenyl radical. It is the fact that the decomposition of this novel type of substance ordinarily produces a high yield of an alkenyl aromatic compound that makes such a substance economically useful as a source of alkenyl aromatic compounds.

A substance embodying the invention is an organosilicon compound having the general formula

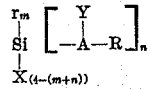

wherein $n$ is an integer from 1 to 2; the sum of $m$ and $n$ is from 1 to 2; $r$ is a saturated monovalent hydrocarbon radical having from one to two carbon atmos; R is a monovalent aromatic radical which has from six to eighteen nuclear carbon atoms and in which any groups other than nuclear carbon and hydrogen atoms consist of not more than five halogens each having an atomic weight less than 80, and not more than two methyl groups; A is a saturated trivalent normal hydrocarbon radical having from two to four carbon atoms, the silicon atom and Y being connected to two adjacent carbon atoms; X is a halogen having an atomic weight less than 80; and Y is a halogen having an atomic weight between 35 and 80.

A saturated monovalent hydrocarbon radical having from one to two carbon atoms is a methyl radical or an ethyl radical.

A halogen having an atomic weight less than 80 is bromine, chlorine or fluorine. A halogen having an atomic weight between 35 and 80 is either bromine or chlorine.

The term "saturated trivalent normal hydrocarbon radical having from two to four carbon atoms, the silicon atom and Y being connected to two adjacent carbon atoms," is used herein to mean a trivalent radical which can be considered to be derived by the removal of three hydrogen atoms (two of which are on two adjacent carbon atoms and the third of which is on any carbon atom) from the molecule of an aliphatic hydrocarbon having from two to four carbon atoms and having saturated

bonds. That is, the trivalent radical can be considered to be derived by the removal of three hydrogen atoms from two or three carbon atoms, at least two of which are adjacent, in the molecule of ethane, propane or butane.

A monovalent aromatic radical which has from six to eighteen nuclear carbon atoms and in which any groups other than nuclear carbon and hydrogen atoms consist of not more than five halogens each having an atomic weight less than 80, and not more than two methyl groups is any radical having from one to three benzene nuclei containing from six to eighteen carbon atoms (e. g., a radical of the benzene, naphthalene, anthracene, phenanthrene, diphenyl or terphenyl series), having no side chains or having one or two side chains each of which is methyl, and having no substituents or having not more than five nuclear substituents each of which is a halogen of atomic weight less than 80. Such radicals include: phenyl, tolyl, xylyl, diphenyl, terphenyl, naphthyl 1-methyl naphthyl, 2-methyl naphthyl, phenyl-naphthyl, anthracyl, 9-methyl anthracyl, 9,10 - dibromoanthracyl, 9,10 - dichloroanthracyl, phenanthryl, 3-methyl phenanthryl, 1,4-dimethyl phenanthryl, bromophenyl, chlorophenyl, o-bromotolyl, m-bromotolyl, p-bromotolyl, o-chlorotolyl, m-chlorotolyl, p-chlorotolyl, 2,6-dichlorotolyl, 4 - bromo - o - xylyl, 4-bromo-m-xylyl, 5-bromo - m - xylyl, 2-bromo-p-xylyl, 3 -bromo-o-xylyl, dichloroxylyl, alpha-bromonaphthyl, beta-bromonaphthyl, 1-bromo-8-methyl naphthyl, 1-bromo - 2 - methyl naphthyl, 4-bromo-2-methyl naphthyl, 8-bromo-2-methyl naphthyl, 1-bromo-5-methyl naphthyl, 1-bromo-2,7-dimethyl naphthyl, 4-bromo-1,6-dimethyl naphthyl, 1-bromo-2,6 - dimethyl naphthyl, 4 - bromo-1,2-dimethyl naphthyl, 1 - bromo - 2,3-dimethyl naphthyl, 1-bromo - 4 - methyl naphthyl, 7-bromo-1-methyl naphthyl, 2 - chloronaphthyl, 1-bromo-3-chloronaphthyl, 2-chloro-1-methyl naphthyl, and 7-chloro-1-methyl naphthyl.

It is preferred that a substance embodying the invention be one, having the general formula hereinbefore defined, in which the silicon atom is connected to A in the 1-position and both Y and R are connected to A in the 2-position, since decomposition of such a substance usually gives the best yields of vinyl aromatic compounds. It is preferred that the formula of such a substance embodying the invention be one in which $m$ is zero (for reasons hereinafter explained), and in which $n$ is 1 since a substance in which $n$ is 1 is less expensive to produce than a substance in which $n$ is 2. It is preferred also that the monovalent aromatic radical R have no side chains. It is desirable in such a substance that R be a monovalent aromatic radical which has six nuclear carbon atoms (e. g., a dichlorophenyl radical) so that the substance on decomposition gives substituted styrenes, which are the most useful vinyl aromatic compounds. It is desirable also that A have only two carbon atoms and that each of the radicals X and Y be chloro.

Substances embodying the invention include alpha-(chlorophenyl) beta-chloroethyltrichlorosilanes, beta-phenyl-beta-choloroethyltrichlorosilane, beta-(dichlorophenyl)-beta-chloropropyltrichlorosilanes and beta-(dichlorophenyl)-beta-chloroethyltrichlorosilanes. A most desirable compound of the invention is a beta-(dichlorophenyl)-beta-chloroethyltrichlorosilane.

The last step in the preparation of a compound of the invention is the introduction of a chloro or bromo group in place of a hydrogen atom connected to a carbon atom adjacent the carbon atom connected to silicon. (The position of a substituent which is connected to a carbon atom adjacent the carbon atom that is connected to silicon in the molecule of such a compound is referred to herein as the "beta position". For example, in a compound having the following structural formula each of the substituents $x$ and $y$ is in a beta position.)

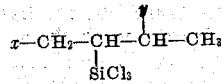

It has been discovered that beta-arylethyltrichlorosilanes chlorinate preferentially in the beta position on the ethyl group under the influence of ultraviolet light. Beta-chlorination is not as specific for aralkylhalosilanes in which the alkyl group in the aralkyl radical attached to a silicon atom has more than two carbon atoms (i. e., when the aralkyl radical is either an arylpropyl or an arylbutyl radical). For example, a beta-arylpropyltrichlorosilane when chlorinated under ultraviolet light usually gives a mixture of beta-arylchloropropyltrichlorosilanes, i. e., a mixture of the beta-aryl-beta-chloro-, the beta-aryl-alpha-chloro- and the beta-aryl-gamma-chloropropyltrichlorosilanes, with the beta-chloro compound predominating. The yield of the beta-chlorinated compound is also decreased when the aryl group in the aralkyl radical attached to a silicon atom is in the alpha-position. When the aryl group in an organosilicon compound of the invention contains methyl radicals, chlorination may take place on the methyl radicals. Thus, as hereinbefore stated, a preferred compound of the invention is one having the general formula hereinbefore defined in which A has only two carbon atoms and in which R contains no side chains and is connected to the same carbon atom as Y.

The chloro or bromo group may be introduced by any desired procedure. For example, a chloro group may be introduced by a liquid phase reaction in which molecular chlorine is brought into contact with the liquid silane to be chlorinated. Ultraviolet light is required to conduct the reaction. The reaction is usually conducted at atmospheric pressure and at a slightly elevated temperature, the maximum temperature at atmospheric pressure being limited by the boiling temperature of the silane to be chlorinated. It is desirable that the chlorine be bubbled into the silane in order to avoid high local chlorine concentrations which are likely to result in burning of the silane and a corresponding darkening of the product. The chlorination proceeds at such a rate in ordinary laboratory apparatus that about one mol of a silane can be chlorinated per hour when the chlorine is introduced through a single jet. Ordinarily, about one mol of chlorine is used per mol of silane to be mono-chlorinated but the amount that is used can be regulated to control the extent of the chlorination. The silane is placed in a suitable reactor and chlorine is admitted (at the bottom of the reactor) as comparatively small bubbles. The chlorine can be dispersed by means of small glass Raschig rings placed at the bottom of the reactor. Ultraviolet light is used to catalyze the chlorination (e. g., from a high pressure mercury vapor lamp equipped with a filter which absorbs all radiation having a wave length shorter than 2800 Angstrom units, 60 per cent of the radiation having a wave length shorter than 3400 Angstrom units and 10 per cent of the radiation having a wave length shorter than 4400 Angstrom units; such a lamp is the "Mazda CH-4" 100 watt ultraviolet lamp). The reaction proceeds at a faster rate at elevated temperatures; so it is ordinarily most desirable to conduct it at a temperature of at least about 50 degrees C. It is not desirable to conduct the reaction at a temperature higher than about 150 degree C., even if the boiling point of the silane to be chlorinated is higher than 150 degrees C. It is most desirable to conduct the reaction at a temperature not higher than about 75 degrees C. Chlorination of a silane can be conducted at a relatively rapid rate. The chlorine is usually introduced (as comparatively small bubbles) through a jet at a rate not less than about 0.7 mol per hour (if it is desired to chlorinate large quantities of a silane, the chlorine can be introduced simultaneously through each of two or more jets at the specified rate). It is most desirable that the rate be at least about 0.9 mol per hour, and not greater than about 1.1 mols per hour.

The reaction can be conducted continuously or as a batch process. When it is run continuously, the liquid silane is passed through a tube, and the chlorine is admitted through jets along the length of the tube. The amount of chlorine introduced per hour per jet is such that the ratio of chlorine to silane does not give an explosive mixture at any point in the reactor; the same considerations govern the amount of chlorine when the reaction is conducted continuously as when it is conducted batchwise. The jets should be so spaced that the temperature of the reaction mixture does not substantially increase or decrease progressively along the length of the reaction tube (i. e., the jets should be sufficiently far apart so that the temperature of the liquid into which chlorine is introduced from any one jet is not substantially higher than the temperature of the liquid into which chlorine is introduced from any other jet).

The hydrogen chloride evolved during the chlorination is collected in a water scrubber. The amount of hydrogen chloride absorbed in the water scrubber may be determined at intervals by titration with sodium hydroxide or potassium hydroxide, or the scrub water may be passed into a flask containing the base and an indicator such as methyl orange until the indicator shows the base to be neutralized.

Substances which may have chlorine or bromine introduced in the beta-position on the alkyl group in the aralkyl radical by the method hereinbefore described or by any other method, to produce compounds of the invention, include: alpha - (trichlorophenyl) ethyltrichlorosilanes, alpha-tolylethyltrichlorosilanes, alpha-(chlorophenyl) ethyltrichlorosilanes, alpha - tolylethylethyldichlorosilanes, beta - phenylethyltrichlorosilanes, beta - (dichlorophenyl) ethyltrichlorosilanes, beta - (dichlorophenyl) propyltrichlorosilanes, beta - (trichlorophenyl) ethyltrichlorosilanes, beta - tolylbutyltrichlorosilanes, beta-tolylpropyltrichlorosilanes, beta - phenylpropyltrichlorosilane, beta - tolylethyethyldichlorosilanes, beta - (chlorophenyl) ethyltrichlorosilanes, gamma - phenylpropyltrichlorosilane, gamma-tolylpropyltrichlorosilanes and gamma-tolylbutyltrichlorosilanes.

These organosilanes and others which may be chlorinated or brominated in the beta position on the alkyl group in the aralkyl radical to produce compounds of the invention may be prepared by a reaction which involves the use of a Friedel-Crafts catalyst. Although Friedel-Crafts catalysts are not generally useful in the reactions of organosilicon compounds because of the fact that such catalysts tend to produce undesirable effects upon such compounds, it has been discovered that substances which may be chlorinated or brominated to produce compounds of the present invention can be prepared by a reaction in which a certain type of Friedel-Crafts catalyst can be used without any deleterious effects. Such a Friedel-Crafts catalyst consists of an aluminum halide in which each halogen atom has an atomic weight between 35 and 80 (i. e., aluminum chloride or aluminum bromide). The terms "aluminum chloride" and aluminum bromide" are used herein to mean anhydrous aluminum chloride and anhydrous aluminum bromide. The preferred aluminum halide is aluminum chloride. The reaction for producing organosilicanes from which compounds of the invention can be prepared consists in contacting the aluminum halide with a composition comprising two substances. One of these two substances is an aromatic compound whose molecule consists of from one to three benzene nuclei containing from 6 to 18 carbon atoms, having at least one hydrogen atom attached to a nuclear carbon atom, having no substituents or having not more than five nuclear substituents each of which is a halogen of atomic weight less than 80, and having no side chains or having not more than two side chains each of which is a methyl radical. Such aromatic compounds include: benzene, toluene, xylene, diphenyl, terphenyl, naphthalene, 2-methyl naphthalene, 1-methyl naphthalene, phenyl-naphthalene, anthracene, 9-methyl anthracene, 9,10-dibromoanthracene, 9,10 - dichloroanthracene, phenanthrene, 3-methyl phenanthrene, 1,4-dimethyl phenanthrene, bromobenzene, chlorobenzene, 1-chloro-4-fluorobenzene, o-bromotoluene, m-bromotoluene, p - bromotoluene, o - chlorotoluene, m-chlorotoluene, p-chlorotoluene, 2,6-dichlorotoluene, 2 - chloro - m-fluorotoluene, 4-bromo-o-oxylene, 4-bromo-m-xylene, 5-bromo-m-xylene, 2-bromo-p-xylene, 3-bromo-o-xylene, dichloroxylene, alpha-bromonaphthalene, beta-bromonaphthalene, 1-bromo-8-methyl naphthalene, 1-bromo-2-methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1-bromo-2,6-dimethyl naphthalene, 4-bromo-1,2-dimethyl naphthalene, 1-bromo-2,3-dimethyl naphthalene, 1-bromo - 4 - methyl naphthalene, 7 - bromo - 1-methyl naphthalene, 2 - chloronaphthalene, 1-bromo-3-chloronaphthalene, 2-chloro-1-methyl naphthalene, and 7-chloro-1-methyl naphthalene.

The other of these two substances is a haloalkylsilane whose molecule consists of a silicon atom to which are attached four monovalent radicals from one to two of which are saturated halo-substituted normal aliphatic radicals having from two to four carbon atoms, in which the halogen atom is connected to any carbon atom and has an atomic weight between 35 and 80 (i. e., alpha- or beta-haloethyl, alpha-, beta-, or gamma-halopropyl, or alpha-, beta-, gamma-, or delta-halobutyl radicals); from two to three of which are halogens having an atomic weight less than 80; the remaining radical, if any, being a saturated hydrocarbon radical having from one to two carbon atoms (i. e., a methyl radical or an ethyl radical). Such haloalkylsilanes include: alpha-chloroethyltrichlorosilane, alpha-chloropropyltrichlorosilane, alpha - chloroethylethyldichlorosilane, alpha-chlorobutyltrichlorosilane, beta - chloroethyltrichlorosilane, beta-chloropropyltrichlorosilane, beta - chlorobutyltrichlorosilane, beta - chloroethylethyldichlorosilane, gamma - chloropropyltrichlorosilane, gamma - chlorobutyltrichlorosilane, and delta-chlorobutyltrichlorosilane.

These haloalkylsilanes and others which may be used to prepare compounds of the invention are prepared by chlorinating or brominating such substances as: ethyltrifluorosilane, diethyldifluorosilane, n-propyltrifluorosilane, n-butyltrifluorosilane, di-n-butyldifluorosilane, ethyldifluorochlorosilane, ethylfluorodichlorosilane, n-propyldifluorochlorosilane, n - propylfluorodichlorosilane, n - butyldifluorochlorosilane, n - butylfluorodichlorosilane, n-butylmethyldichlorosilane, ethyltrichlorosilane, ethylmethyldichlorosilane, methylpropyldichlorosilane, diethyldichlorosilane, ethyl-n-propyldichlorosilane, n-propyltrichlorosilane, di-n-propyldichlorosilane, i-propyltrichlorosilane, n-butyltrichlorosilane and secondary-butyltrichlorosilane. It is preferred that the halogen atom introduced into the aliphatic radical and the halogen atoms attached to the silicon atom be chlorine, since chlorine is a cheaper raw material than bromine. The method of chlorinating may be the one using ultraviolet light as hereinbefore described or any other method. It is preferred that compounds of the invention be formed from starting materials which are alkyltrihalosilanes. Better yields of the monochlorinated product can be obtained by chlorination of a silane containing only one alkyl radical. The chlorination of an alkyltrihalosilane, such as ethyltrichlorosilane, is a clear cut reaction that proceeds smoothly and rapidly to give a mixture of unchlorinated ethyltrichlorosilane, alpha-chloroethyltrichlorosilane, beta-chloroethyltrichlorosilane, alpha,beta-dichloroethyltrichlorosilane, and some polychlorinated ethyltrichlorosilanes. Beta-chloroethyltrichlorosilane is obtained in the largest amount.

The procedure for contacting the aluminum halide with the haloalkylsilane (as herebefore defined) and the aromatic compound (as hereinbefore defined) in order to prepare substances which may be chlorinated or brominated to form compounds of the invention comprises adding the aluminum halide in small portions to a mixture of the haloalkylsilane and the aromatic compound. Usually, the first portion of the aluminum halide (¼ to ⅓ of the total amount to be added) is added very carefully at room temperature to the reaction mixture, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. When the concentration of aluminum halide is maintained at the minimum necessary for reaction, it is possible to isolate the pure product by double distillation. It is usually desirable, however, to remove the catalyst before distillation, for example, by adding to the reaction mixture phosphorus oxychloride, which binds aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling an amount of a hydrocarbon solvent equal to the volume of the reaction mixture is added to precipitate the AlCl₃.POCl₃ complex. Such hydrocarbon solvents include pentane, ligroin and petroleum ethers. The mixture is allowed to stand over night, and the solid complex is filtered from the solution or the liquid to be distilled is decanted from the mixture, leaving a residue containing the AlCl₃.POCl₃ complex. An absorbing agent such as kieselguhr may be added in place of the hydrocarbon solvent to absorb the AlCl₃.POCl₃ complex and after the reaction mixture cools to room temperature, the liquid to be distilled may be filtered from the absorbed complex. There is less chance that aluminum chloride will distill with the product when it is in the form of a complex than when it is in the free state, and when this complex is relatively nonvolatile as compared to the organosilane product the product may be distilled under reduced pressure in the presence of the AlCl₃.POCl₃ complex.

The aluminum halide should not be added in excess of about 5 mole per cent (based upon the amount of haloalkylsilane present in the reaction mixture). It is most desirable that the amount of the aluminum halide used be not more than about 2 mole percent and not less than about .75 mole per cent.

An excess of aromatic compound over haloalkylsilane is used to obtain a high yield of the desired reaction product. A desirable molar ratio of aromatic compound to haloalkylsilane is about 3 to 1. The excess aromatic compound (and the hydrocarbon solvent, if any is used) are distilled from the reaction mixture before distillation of the pure product.

Organosilanes which may be chlorinated or brominated to produce compounds embodying the invention are prepared by the following procedures in which an aromatic hydrocarbon is reacted with a haloalkylsilane using an aluminum halide as a catalyst:

(a) A haloalkylsilane (75 grams of beta-chlorobutyltrichlorosilane) and an aromatic hydrocarbon (92 grams of toluene) are placed in a 500 ml. three-necked flask equipped with a mercury sealed stirrer and a reflux condenser fitted with a calcium chloride tube. The mixture is stirred and an aluminum halide (0.5 gram of aluminum chloride) is added to the mixture in small portions over a period of 20 minutes. The reaction is slightly exothermic accompanied by copious evolution of HCl. After the entire amount of aluminum chloride has been added, the mixture is stirred and refluxed for 15 minutes to complete reaction and drive off HCl.

The reaction mixture is then placed in a Claisen flask and heated at about 111 degrees C. at atmospheric pressure to distill toluene (70 grams). The distillation is then continued under reduced pressure to obtain a crude beta-tolylbutyltrichlorosilane (58 grams), B. P. 173–176 degrees C. at 36 mm. Hg (i. e., boiling within the range from 173–176 degrees C. at an absolute pressure of 36 mm. of mercury). This crude product is then redistilled under reduced pressure to give a water white beta-tolylbutyltrichlorosilane, B. P. 122–123 degrees C. at 1.5 mm. Hg.

(b) An aromatic hydrocarbon (138 grams of toluene) is reacted with a haloalkylsilane (106 grams of beta-chloropropyltrichlorosilane) by the procedure given in (a) except that the aluminum chloride (0.5 gram) is added in small quantities over a period of 45 minutes. Distillation under reduced pressure yields a crude beta-tolylpropyltrichlorosilane (60 grams), B. P. 173–176 degrees C. at 52 mm. Hg. Redistillation under reduced pressure yields a water white beta-tolylpropyltrichlorosilane, B. P. 124–125 degrees C. at 3 mm. Hg.

(c) An aromatic hydrocarbon (78 grams of benzene) is reacted with a haloalkylsilane (71 grams of beta-chloropropyltrichlorosilane) by the procedure given in (a) except that the aluminum chloride (0.5 gram) is added in small quantities over a period of 25 minutes, and after addition of the aluminum chloride is completed, the mixture is refluxed for 20 minutes. Distillation under reduced pressure yields beta-phenylpropyltrichlorosilane (60 grams), B. P. 165-168 degrees C. at 70 mm. Hg. Redistillation under reduced pressure yields water white beta-phenylpropyltrichlorosilane, B. P. 110-111 degrees C. at 2 mm. Hg.

(d) An aromatic hydrocarbon (92 grams of toluene) is reacted with a haloalkylsilane (63.8 grams of beta-chloroethylethyldichlorosilane) by the procedure given in (a) except that the mixture is heated while the aluminum chloride (0.53 gram) is added in small portions over a period of 20 minutes and after the addition of AlCl₃ is completed, the mixture is refluxed for two hours. Distillation under reduced pressure yields a beta-tolylethylethyldichlorosilane, B. P. 124-125 degrees C. at 1 mm. Hg.

(e) An aromatic hydrocarbon (113 grams of chlorobenzene) is reacted with a haloalkylsilane (66½ grams of beta-chloroethyltrichlorosilane) by the procedure given in (a) except that after addition of the aluminum chloride (0.53 gram) the mixture is refluxed for one hour. Distillation under reduced pressure yields a beta-(chlorophenyl)ethyltrichlorosilane (48 grams), B. P. 156-166 degrees C. at 23 mm. Hg. Redistillation gives a colorless product, B. P. 118-119 degrees C. at 1 mm. Hg.

(f) A haloalkylsilane (99 grams of mixed alpha- and beta-chloroethyltrichlorosilane) and an aromatic hydrocarbon (182 grams of trichlorobenzene) are placed in a 500 ml. three-necked flask equipped with a mercury sealed stirred and a reflux condenser fitted with a calcium chloride tube. Aluminum chloride (0.35 gram, i. e., one-half the total charge of 0.7 gram to be added) is added and the mixture stirred and refluxed for three quarters of an hour (the reaction begins rather sluggishly at a temperature of about 115 degrees C., and HCl is evolved at a moderate rate) after which time the remainder of the aluminum chloride (0.35 gram) is added. The stirring and heating of the mixture is continued (for about an hour and 45 minutes) until the evolution of HCl ceases. The reaction mixture is then placed in a Claisen flask and excess trichlorobenzene is distilled under reduced pressure. Distillation is continued to obtain a mixed alpha- and beta - (trichlorophenyl)ethyltrichlorosilane (45 grams), B. P. 166-168 degrees C. at 2 mm. Hg.

(g) A haloalkylsilane (105 grams of alpha-chloroethyltrichlorosilane) and an aromatic hydrocarbon (138 grams of toluene) are reacted by the same procedure given in (a) except that after the addition of the aluminum chloride (0.8 gram) the mixture is refluxed for one hour. Distillation of the reaction mixture from a Claisen flask under reduced pressure yields an alpha-tolylethyltrichlorosilane (35 grams), B. P. 174-178 degrees C. at 70 mm. Hg. Redistillation of this product under reduced pressure yields a colorless alpha-tolylethyltrichlorosilane, B. P. 109-110 degrees C. at 2 mm. Hg.

(h) An aromatic hydrocarbon (92 grams of toluene) is reacted with a haloalkylsilane (63 grams of alpha-chloroethylethyldichlorosilane) by the procedure given in (d). Distillation under reduced pressure yields an alpha-tolylethylethyldichlorosilane (6 grams), B. P. 139-140 degrees C. at 6 mm. Hg.

(i) A haloalkylsilane (106 grams of gamma-chloropropyltrichlorosilane) and an aromatic hydrocarbon (138 grams of toluene) are mixed in a 500 ml. three-necked flask equipped with a mercury sealed stirrer and a reflux condenser fitted with a calcium chloride tube. Aluminum chloride (0.25 gram, i. e., one-half of the total amount of 0.5 gram to be added) is added in small portions to the mixture. Evolution of HCl is very slow. Forty minutes after the aluminum chloride is added, the mixture is heated until the toluene starts to reflux. The rate of evolution of HCl increases when this heating is started. Heating is continued for one hour during which time the remainder of the aluminum chloride (0.25 gram) is added in small portions. The reaction mixture is then placed in a Claisen flask and distilled under reduced pressure to yield a gamma-tolylpropyltrichlorosilane (30 grams), B. P. 178-180 degrees C. at 50 mm. Hg. This product is redistilled under reduced pressure and a water white gamma-tolylpropyltrichlorosilane, B. P. 126-127 degrees C. at 1.5 mm. Hg is recovered.

(j) By the above procedure gamma-chlorobutyltrichlorosilane (56 grams) is reacted with toluene (79 grams) in the presence of aluminum chloride (0.4 grams), distillation of the reaction mixture under reduced pressure yielding a gamma-tolylbutyltrichlorosilane (12 grams), B. P. 188-195 degrees C. at 52 mm. Hg. Redistillation of this product yields a water white gamma-tolylbutyltrichlorosilane, B. P. 121-122 degree C. at 1.5 mm. Hg.

The series of reactions involved in the preparation of an organo-silicon compound of the invention, for example, a beta-(dichlorophenyl) beta-chloroethyltrichlorosilane, may be represented by the following equations:

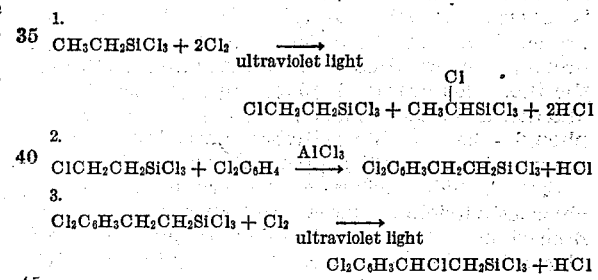

The chlorination of a beta-(dichlorophenyl)ethyltrichlorosilane (either beta - 3,4 - dichlorophenylethyltrichlorosilane or beta-2,3-dichlorophenylethyltrichlorosilane) goes readily and offers no particular difficulties. The chlorination ordinarily give a yield between 80 and 100 per cent of the beta - (dichlorophenyl) beta - chloroethyltrichlorosilane. With low enough pressure it is usually possible to fractionate the resulting mixture into chlorinated and unchlorinated material.

The preparation of compounds embodying the invention is illustrated by the following examples:

*Example 1*

Compounds embodying the invention are prepared by the following procedures:

(a) A haloalkylsilane (66.5 grams of beta-chloroethyltrichlorosilane) and an aromatic hydrocarbon (78 grams of benzene) are mixed in a 500 ml. 3-necked flask equipped with a mercury sealed stirrer and a reflux condenser fitted with a calcium chloride tube. Aluminum chloride (0.55 grams) is added to the mixture in small portions. The mixture is heated slowly for about twenty minutes. The heating is then discontinued for about twenty minutes, during which time the mixture reacts vigorously. Heating is again continued for 35 minutes to complete the reaction and to expel HCl. The reaction mixture is then distilled from a Claisen flask to yield beta-phenylethyltrichlorosilane (52 grams), B. P. 164–174 degrees C. at 80 mm. Hg (i. e., boiling within the range from 164 to 174 degrees C. at an absolute pressure of 80 mm. of mercury). This crude product is then redistilled under reduced pressure to yield colorless beta-phenylethyltrichlorosilane, B. P. 107–108 degrees C. at 2 mm. Hg.

An aralkylsilane (185 grams of beta-phenylethyltrichlorosilane, prepared as described in the preceding paragraph) is charged to a glass chlorination tube approximately three feet in length, having an internal diameter of about 50 mm. The tube is packed at the bottom with Raschig rings (to a height of about 5 cm.) and fitted with a gas inlet tube (having an internal diameter of about 6 mm.) which is sealed through the bottom of the chlorination (reactor) tube so that the chlorine is discharged vertically (near the bottom of the reactor) into the aralkylsilane. The top of the reactor tube is fitted with a Dry-Ice condenser and a glass tube which conducts any gases not condensed in the Dry-Ice condenser to a water scrubber where the HCl formed by the chlorination is removed. The chlorination tube is illuminated with ultraviolet light from a "Mazda CH-4" 100 watt ultraviolet lamp. As chlorine gas is introduced into the chlorination tube, the evolved HCl is passed from the top of the Dry-Ice condenser to the scrubber. The scrub water is passed into a flask containing an equivalent amount of potassium hydroxide (43.2 grams) and methyl orange as an indicator. The chlorine is passed through the tube until the methyl orange indicator shows that the potassium hydroxide is neutralized. The chlorinated liquid in the tube (203 grams) is placed in a Claisen flask and distilled under reduced pressure to yield beta-phenyl - beta - chloroethyltrichlorosilane (182 grams), B. P. 132–135 degrees C., at 2 mm. Hg.

(b) A haloalkylsilane (66 grams of beta-chloroethyltrichlorosilane) and an aromatic hydrocarbon (147 grams of o-dichlorobenzene) are placed in a 500 ml. 3-necked flask equipped with a mercury sealed stirrer and a reflux condenser fitted with a calcium chloride tube. Aluminum chloride (0.35 grams, i. e., about one-half the total amount of 0.69 grams to be added) is added, and the mixture is stirred and heated for about twenty minutes. Heating is discontinued while the remainder of the aluminum chloride (0.34 grams) is added, and then the mixture is again stirred and refluxed for 1½ hours. The mixture is cooled to about 95 degrees C. Phosphorus oxychloride (0.76 grams) is added to complex the aluminum chloride in the mixture which is then placed in a Claisen flask. Unreacted o-dichlorobenzene is distilled under reduced pressure. The distillation is then continued and a fraction (56 grams), B. P. 120–132 degrees C. at 1 mm. Hg, is recovered. This fraction is redistilled under reduced pressure to yield a water white beta-(dichlorophenyl)ethyltrichlorosilane, B. P. 136–138 degrees C. at 2 mm. Hg.

An aralkylsilane (183 grams of the beta-(dichlorophenyl)-ethyltrichlorosilane prepared as in the preceding paragraph) is chlorinated using the apparatus and procedure described in the second paragraph of (a). A beta-(dichlorophenyl) - beta - chloroethyltrichlorosilane (200 grams) is obtained in the reactor tube.

(c) A haloalkylsilane (405 grams of beta-chloropropyltrichlorosilane) and an aromatic hydrocarbon (850 grams of o-dichlorobenzene) are placed in a 2 liter 3-necked flask equipped with a mercury sealed stirrer and a reflux condenser fitted with a calcium chloride tube. Aluminum chloride (1.2 grams, i. e., about one-third of the total amount of 3.7 grams to be added) is added and the mixture is stirred and heated gently for about 45 minutes. The heating is then discontinued and a second portion of AlCl₃ (1.2 grams) is added. The evolution of HCl becomes vigorous and the flask is cooled. After the reaction subsides, the remainder of the AlCl₃ (1.3 grams) is added and the mixture is stirred and heated sufficiently so that evolution of HCl continues. After two hours the heating is discontinued and phosphorus oxychloride (4.5 grams) is added to complex the AlCl₃. When the reaction mixture has cooled, it is poured into a hydrocarbon solvent (1250 ml. of "Sohio S. R. solvent," a petroleum fraction composed mainly of aliphatic hydrocarbon material, boiling within the range 100 to 286 degrees F.) and the resulting mixture is allowed to stand for 24 hours at a temperature of 30 degrees F. to precipitate the AlCl₃ complex. The liquid is then decanted into a Claisen flask, leaving a dark residue containing the AlCl₃·POCl₃ complex. The hydrocarbon solvent is distilled at atmospheric pressure. The excess o-dichlorobenzene (473 grams) is then distilled under reduced pressure. The residue is then distilled under reduced pressure, and a fraction (450 grams, B. P. 138–150 degrees C. at 1 mm. Hg, is recovered. This fraction is redistilled at reduced pressure to give an almost colorless material comprising mainly beta-(dichlorophenyl)-propyltrichlorosilane, B. P. 143–145 degrees C. at 1 mm. Hg.

An aralkylsilane (250 grams of the beta-(dichlorophenyl)propyltrichlorosilane prepared by the procedure described in the preceding paragraph) is chlorinated using the apparatus and procedure described in the second paragraph of (a). The chlorinated material (275 grams of a mixture comprising beta-(dichlorophenyl)chloropropyltrichlorosilanes, predominantly a beta-(dichlorophenyl) - beta - chloropropyltrichlorosilane) is obtained in the reactor tube.

(d) A haloalkylsilane (198 grams of alpha-chloroethyltrichlorosilane) and an aromatic hydrocarbon (226 grams of chlorobenzene) are mixed in a 2 liter 3-necked flask equipped with a mercury sealed stirrer and a reflux condenser fitted with a calcium chloride tube. Aluminum chloride (0.66 grams, i. e., about one-third of the total amount of 2.0 grams to be added) is added and the mixture is stirred and heated gently. After about twenty minutes the heating is discontinued while a second portion of aluminum chloride (0.66 grams) is added carefully. When the reaction rate subsides, the mixture is again heated for about twenty minutes, after which the remainder of the aluminum chloride (0.68 grams) is added, the temperature being controlled to prevent too vigorous reaction. The mixture is then refluxed gently to complete a total reaction period of four hours. The mixture is then cooled to a temperature of about 95 degrees C. and phosphorus oxychloride (about 3.1 grams) is added to complex the aluminum chloride. After further cooling, a hydrocarbon solvent (435 ml. of "Sohio S. R. solvent") is added to the mixture, which is then allowed to stand over night before filtering off the precipitated complex. The filtrate is transferred to a Claisen flask, and the hydrocarbon solvent and excess chlorobenzene are distilled. The residue is then distilled under reduced pressure and a fraction (180 grams), B. P. 125–170 degrees C. at 2 mm. Hg, is recovered. This fraction is redistilled at reduced pressure to give a water white alpha-(chlorophenyl)ethyltrichlorosilane (158 grams), B. P. 126–128 degrees C. at 2 mm. Hg.

An aralkylsilane (431 grams of the alpha-(chlorophenyl)ethyltrichlorosilane prepared by the procedure described in the preceding paragraph) is chlorinated, using the apparatus and procedure described in the second paragraph of (a). The chlorinated material (465 grams of a mixture comprising mainly an alpha-(chlorophenyl)-beta-chloroethyltrichlorosilane and an alpha - (chlorophenyl) - alpha - chloroethyltrichlorosilane with some alpha-(chlorophenyl)- ethyltrichlorosilane) is obtained in the reactor tube.

Other organosilanes (prepared as hereinbefore described) which may be chlorinated by the procedure described in (a) to produce compounds embodying the invention include: alpha-(trichlorophenyl)ethyltrichlorosilanes, alpha-tolylethyltrichlorosilanes, alpha - (chlorophenyl)ethyltrichlorosilanes, alpha - tolylethylethyldichlorosilanes, beta - (trichlorophenyl) - ethyltrichlorosilanes, beta - tolylbutyltrichlorosilanes, beta-tolylpropyltrichlorosilanes, beta - phenylpropyltrichlorosilanes, beta - tolylethylethyldichlorosilanes, beta - (chlorophenyl)ethyltrichlorosilanes, gamma-tolylpropyltrichlorosilanes and gamma-tolylbutyltrichlorosilanes.

Having described the invention, I claim:

1. An organosilicon compound having the general formula

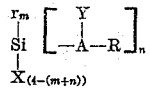

wherein $n$ is an integer from 1 to 2; the sum of $m$ and $n$ is an integer from 1 to 2; $r$ is a saturated monovalent hydrocarbon radical having from one to two carbon atoms; R is a monovalent aromatic radical which has from six to eighteen nuclear carbon atoms and in which any groups other than nuclear carbon and hydrogen atoms consist of not more than five halogens each having an atomic weight less than 80, and not more than two methyl groups; A is a saturated trivalent normal hydrocarbon radical having from two to four carbon atoms, the silicon atom and Y being connected to two adjacent carbon atoms; X is a halogen having an atomic weight less than 80; and Y is a halogen having an atomic weight between 35 and 80.

2. An organosilicon compound as claimed in claim 1 wherein the silicon atom is connected to A in the 1-position and both Y and R are connected to A in the 2-position.

3. An organosilicon compound as claimed in claim 2 in which $m$ is zero.

4. An organosilicon compound as claimed in claim 3 in which $n$ is 1.

5. An organosilicon compound having the general formula

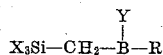

wherein R is a monovalent aromatic radical which has from six to eighteen nuclear carbon atoms and in which any atoms other than nuclear carbon and hydrogen atoms consist of not more than five halogen atoms each having an atomic weight less than 80; B is a saturated trivalent hydrocarbon radical having from one to three carbon atoms, in which the three free valences are attached to the same carbon atom; X is a halogen having an atomic weight less than 80; and Y is a halogen having an atomic weight between 35 and 80.

6. An organosilicon compound as claimed in claim 5 in which R has six nuclear carbon atoms.

7. An organosilicon compound as claimed in claim 6 in which B is CH.

8. An organosilicon compound as claimed in claim 7 in which each of the radicals X and Y is chloro.

9. A beta-(dichlorophenyl)-beta - chloroethyltrichlorosilane.

10. Beta - phenyl - beta - chloroethyltrichlorosilane.

11. A beta-(dichlorophenyl)-beta - chloropropyltrichlorosilane.

12. An alpha-(chlorophenyl)-beta - chloroethyltrichlorosilane.

RAYMOND H. BUNNELL.

REFERENCES CITED

The following references are of record in the file of this patent:

UNITED STATES PATENTS

| Number | Name | Date |
|---|---|---|
| 2,265,312 | Quattlebaum | Dec. 9, 1941 |
| 2,290,759 | Levine | July 21, 1942 |
| 2,416,990 | Gorin | Mar. 4, 1947 |
| 2,420,689 | Sturrock | Mar. 20, 1947 |
| 2,436,777 | Pecher | Feb. 24, 1948 |
| 2,474,578 | Gilliam | June 28, 1949 |